UNITED STATES PATENT OFFICE.

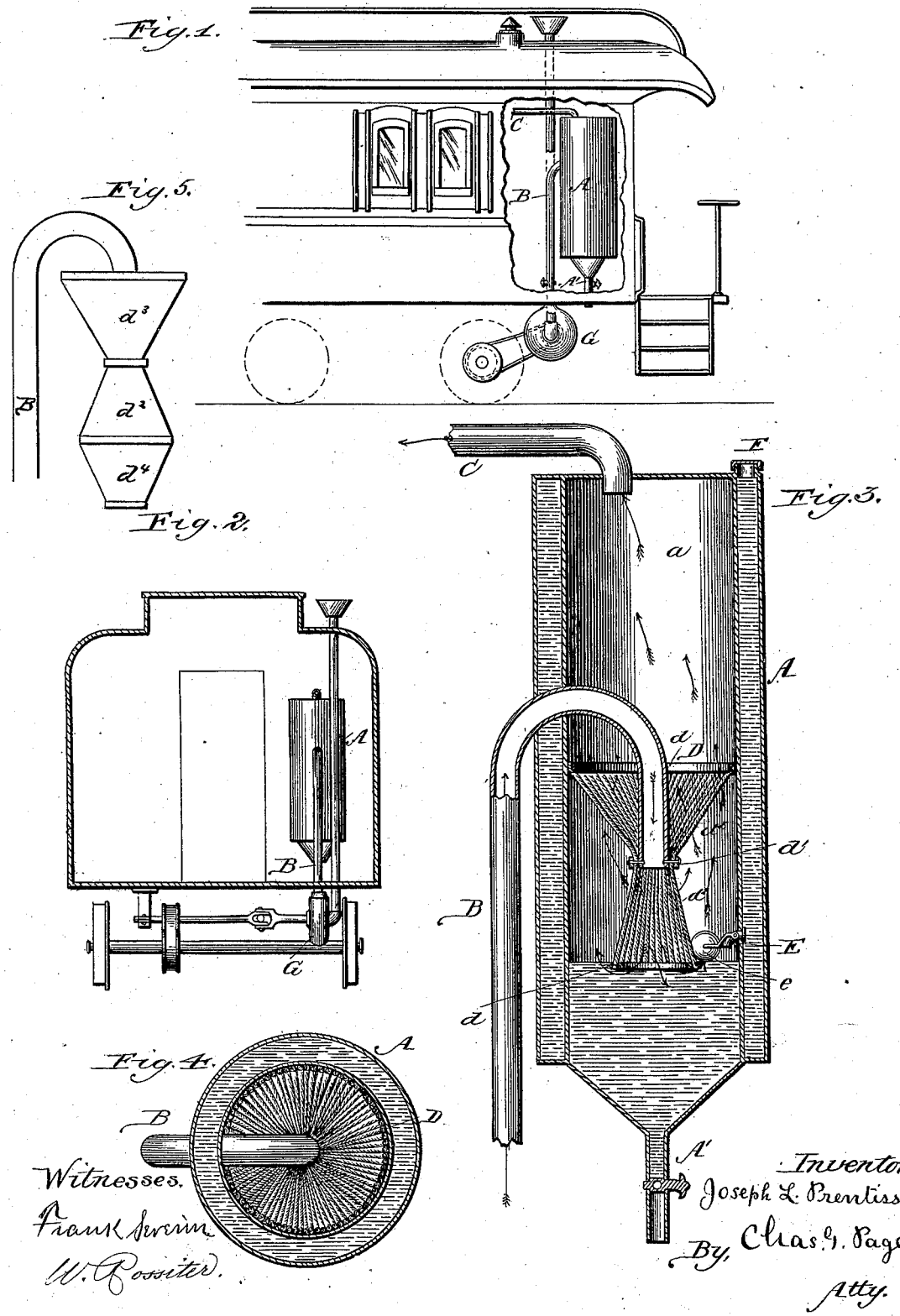

JOSEPH L. PRENTISS, OF CAÑON CITY, COLORADO, ASSIGNOR OF ONE-HALF TO HENRY E. FINNEY, OF CHICAGO, ILLINOIS.

CAR-VENTILATOR.

SPECIFICATION forming part of Letters Patent No. 356,851, dated February 1, 1887.

Application filed March 30, 1886. Serial No. 197,231. (No model.)

*To all whom it may concern:*

Be it known that I, JOSEPH L. PRENTISS, a citizen of the United States, residing at Cañon City, in the county of Fremont and State of Colorado, have invented certain new and useful Improvements in Purifying Air, of which the following is a specification.

The objects of my invention are to effectively purify and reduce to a moderate temperature a volume of air passing from the external atmosphere into rooms or apartments requiring ventilation, and more particularly to provide improved means for freeing a blast or current of air from heavy impurities—such as dust, cinder, and the like—and at the same time filtering the air in a manner whereby it shall be reduced to a moderate temperature.

The principle of my invention consists in first directing the air against and over a body of water, and then passing it through a strainer or strainers composed of cotton-wicking or other suitable textile or fibrous material so arranged as to dip into the body of water, in which way the strainer or strainers, by reason of capillary attraction, will be kept moist, so that the air passing through the same will be filtered of any particles not previously deposited in the water, and at the same time, by reason of the promotion of evaporation of the water taken up by the strainer, it will be necessarily reduced to a moderate temperature.

An illustration of one of the applications of my improvement is its use in connection with railway-cars, where the necessity of means for freeing from dust and cinders the air admitted into the car has long been felt. In such application the air-current is conveniently created by a blower. The air-current first enters a tank or chamber containing a strainer of the character aforesaid and a suitable quantity of water. The discharge end of the air-inlet pipe is arranged to direct the air-current downwardly against the body of water, after which the air passes through the strainer. A large portion of the impurities will be in the first instance deposited in the water, while the balance will be arrested by the strainer.

This apparatus can, however, be utilized wherever a volume of air is to be purified and utilized for ventilating purposes—for example, hospitals or other buildings, ships, and the like.

Cooling air by passing it over a saturated surface is an old expedient.

It has also been proposed to purify air to be supplied to railway-cars by passing it over a body of water with the intention that the splashing up of the water shall relieve the air from dust and cinders, and it has also been suggested to filter the air in such cases by passing it through wire screens; but in such cases the purification will be only partial, and, moreover, the air will not be reduced in temperature—a matter which, if attained in a railway-car passing over a dusty road in hot weather, would obviously be a great relief to the passengers.

In the drawings illustrative of the principles of my invention, Figure 1 represents a portion of a railway-car with a part of one side broken away, so as to show an air-purifying apparatus constructed in accordance with my invention and arranged to supply the interior of the car with purified air. Fig. 2 is a transverse vertical section through Fig. 1. Fig. 3 represents, on a larger scale, a vertical central section through the purifying apparatus. Fig. 4 is a horizontal section on the line $xx$, Fig. 3. Fig. 5 represents a form of strainer embodying the principles of the one illustrated in Fig. 3, but having a somewhat different shape, whereby the full force of the incoming air-blast upon the water shall be checked.

In said drawings, A denotes as a whole the shell or casing of the purifier; B, the air-inlet pipe, and C the air-outlet pipe.

With reference to the construction of the shell or casing it is proposed to make it double-walled, in order to provide a water-space around the inner cylindric or otherwise appropriately-shaped chamber, $a$, the object of such construction being to provide within as small and convenient space as practicable a reservoir for carrying the water that is from time to time to be let into and utilized within the inner purifying-chamber, $a$, and incidentally to keep the wall of said chamber cool.

The purifying-chamber contains a suitable quantity of wicking designed to be kept constantly moist and arranged so that the inflowing current of air shall, after impinging against or passing over a body of water in the bottom of said chamber, pass through one or more partitions of wicking or other analogous material. In this way, while a considerable portion of the dust and cinders will in the first instance pass directly into and be taken up by the body of water, all remaining particles of dust and the like will, as the air is passing through the partition or strainer of wicking, be effectively arrested.

The air passing through one or more moistened strainers of such character is not only completely strained of all impurities, but is also cooled and moistened sufficiently to render it agreeable to the occupants of the car or room into which it eventually passes.

The disposition of wicking herein presented is simple and practical, and is well adapted for carrying out the principles of my invention. This disposition is as follows: The wicking is arranged to form a strainer, D, made into the shape of a double funnel or two truncated cones with their apices in conjunction, and preferably with one somewhat smaller than the other. The strainer thus composed of wicking or other analogous or suitable textile or fibrous material is suspended within the purifying-chamber, with the larger conical portion above the smaller, as shown, and for purposes herein presently explained.

To maintain the funnel-shaped ends of the strainer in a properly-expanded condition, it is proposed to attach the wicking to rings $d\,d$ at such points, and desirably to attach the ring at the upper end of the strainer to the wall of the purifying-chamber in any desired way.

The strainer can be kept open at the point of junction between its two cone-shaped portions by a small ring; but more desirably the air-inlet pipe B, after entering the purifying-chamber, is bent down and extended to bring its discharge end at a point where the contraction in the passage between said two cone-shaped parts of the strainer occurs, in which case a ring or band, $d'$, girdling the strainer, can be secured to the pipe by bolts or the like.

The height of water within the purifying-chamber should be sufficient to permit the strainer to dip into the water, so as to take up the same by capillary attraction, and thus keep the strainer constantly moist.

The course of the air through the purifier is herein indicated by arrows. More particularly described, the mode of operation is as follows: The inlet-pipe B being connected with some suitable source of supply of air under pressure—for example, a blower—and the cock or valve of such pipe (where a valve is present) being opened, the current of air forced through pipe B will pass down into the lower chamber or space within the lower conical portion, $d^2$, of the strainer or filter, and will impinge against the body of water with more or less force, according to the force of the current. Thence the air passes out through the sides of the lower portion, $d^2$, and up through the sides of the upper portion, $d^3$, of the strainer, and finally out through pipe C, which serves to conduct the cooled, moistened, and purified air to such point as it may be needed. As hereinbefore stated, a portion of the dust and cinders will in the first instance fall or pass into the water, owing to the fact that prior to passing through the interstices, meshes, or small side passages of the strainer the air passes over a body of water in close proximity thereto, and, moreover, impinges against the water with a degree of force proportional to the force of the inflowing air-current. Passing through the strainer or filter the air is evidently strained or filtered of all remaining particles of dust or smoke and most effectively purified, in addition to which it is properly cooled, since the presence of the water, just described as subserving one useful function, also serves to keep the strainer or filter moist.

The height of the body of water within the purifying-chamber may be varied, but it is more desirable to maintain it about at the height indicated, so as to permit the strainer to at all times dip into the water and yet leave ample air-space within or under the strainer and below the discharge end of the air-inlet pipe. To the attainment of such end the space formed between the two concentric walls and constituting a reservoir can be filled with water, and a proper quantity of water let into the purifying-chamber from time to time, as needed, through a cock, as at E. More desirably this cock will be automatic in its operation, so as to avoid the care of an attendant, and for this purpose any known form of ball-cock or float can be employed, so that when the water sinks too low the ball $e$, floating upon the water, will drop sufficiently to open the cock and thus admit into the purifying-chamber a proper supply of water from the reservoir.

Preferably the purifying-chamber will have an outlet for drawing off sediment—for example, a pipe, A', leading from the bottom of the purifying-chamber and provided with a suitable valve.

The reservoir surrounding the purifying-chamber is shown provided with an inlet closed by a screw-cap, F, which will be convenient when the reservoir thus surrounds the purifying-chamber in place of being formed by a separate tank placed above or at some distance from the chamber that is to be supplied.

Figs. 1 and 2 illustrate my invention applied to a railway-car. The casing A is conveniently set up at one corner of the car, with the waste-pipe A' arranged to extend down through the car-floor. The air-supply is derived from a blower, G, that is arranged under the car and driven from one of the axles in any suitable way. In this instance the supply of air for the blower can be taken in above the car by means of a pipe, H, arranged to extend from the blower up through the car-roof. The pipe B for supplying the purifying-chamber likewise connects with the blower, while the air-discharge pipe C can be extended to any point within the car or be connected with any preferred arrangement of distributing-pipes. This application of my purifier is an important one, and possibly the most important of all, since the need of means for freeing from dust and cinders the air supplied to railway-cars has long been felt and has called forth a great variety of attempted devices. I do not, however, limit myself to this special application, since my apparatus could be used to advantage in other places—such as hospitals, hotels, and the like—one of the cardinal advantages in such places being the introduction of cool pure air into the room or rooms to be supplied and ventilated.

With regard to the special construction of apparatus shown in Figs. 3 and 4, I desire to be understood in my broadest claims as covering first the method of passing a current of air over a body of water, and then through a water saturated or moistened strainer or filter, and next the combination, with an air-supply pipe, of a saturated partition or strainer of some fibrous or textile material arranged over a body of water in position whereby the air discharging from the inlet-pipe shall first impinge against and pass over the water and then pass through the strainer.

In Fig. 5 I have shown the lower cone portion of the strainer of Fig. 3 united at its base to an inverted conical strainer, $d^4$, made somewhat in the shape of a truncated cone and arranged to dip into the water. This construction can be employed where it is found desirable to retard or partially arrest the force of the incoming air-blast on the water, so as to prevent splashing. Either construction may, however, be used with advantage.

What I claim as my invention is—

1. As a means for purifying air, a strainer composed of some suitable textile or fibrous material disposed within a chamber in a manner to dip into a body of water therein contained and an air-inlet pipe arranged to direct the inflowing current of air over the body of water prior to the passage of the air through the strainer, substantially as described.

2. The herein-described double conical strainer of fibrous material disposed within the purifying-chamber and arranged to dip into a body of water therein contained, combined with the air-inlet pipe, disposed to enter the double conical strainer and direct the inflowing air-current within that portion of the strainer that dips into the water, substantially as described.

3. The combination, with a chamber provided with an air inlet and outlet pipes, of the double cone-shaped strainer D, composed of wicking and having one of its flaring ends disposed to dip into a body of water that may be contained within said chamber, the air-inlet pipe having its discharge end terminating within and at or about the middle of the double cone-shaped strainer, substantially as described.

4. The strainer, such as set forth, contained within a purifying-chamber and arranged to dip into a body of water contained in said chamber, combined with the air-inlet pipe for directing the air-current against the water prior to the passage of the air through the strainer, the outlet-pipe leading from said purifying-chamber, a water-reservoir connected with the purifying-chamber, and means suitable for letting on or cutting off the supplies of water to the purifying-chamber, whereby the water within the latter can be maintained at a height suitable for reaching the strainer.

5. The combination, with the chamber provided with an air outlet pipe and containing a strainer composed of some suitable textile or fibrous material disposed to dip into a body of water contained within said chamber, of the air-inlet pipe B, adapted to direct an inflowing current of air over the water prior to the passage of the air through the strainer, and a blower for forcing a current of air through said air-inlet pipe, substantially as and for the purpose specified.

6. The double-walled vessel providing a purifying-chamber surrounded by a water-space appropriate for forming a water-reservoir for supplying the chamber, in combination with means for permitting the flow of water from said reservoir to the purifying-chamber, the strainer of suitable fibrous material placed within the purifying-chamber, for the purpose set forth, and air inlet and outlet pipes connected with the purifying-chamber, substantially as described.

JOSEPH L. PRENTISS.

Witnesses:
 L. M. NELSON,
 S. M. DAVIS.